United States Patent [19]

McIntosh

[11] Patent Number: 5,373,700

[45] Date of Patent: Dec. 20, 1994

[54] NATURAL GAS VEHICLE FUEL VAPOR DELIVERY SYSTEM

[76] Inventor: Glen E. McIntosh, 2310 Dennison La., Boulder, Colo. 80303

[21] Appl. No.: 16,621

[22] Filed: Feb. 12, 1993

[51] Int. Cl.⁵ .......................... F17C 9/02; F02M 21/02
[52] U.S. Cl. ...................... 62/48.1; 62/50.2; 62/50.4; 123/525; 123/527
[58] Field of Search ............ 62/48.1, 50.2, 50.4; 123/525, 527

[56] References Cited

U.S. PATENT DOCUMENTS

| | | | |
|---|---|---|---|
| 2,753,856 | 7/1956 | Rush | 62/50.4 X |
| 3,097,497 | 7/1963 | Fitt | 62/50.4 |
| 3,114,357 | 12/1963 | Mortin et al. | 123/527 |
| 3,220,393 | 11/1965 | Schlink | 123/527 |
| 3,392,537 | 7/1968 | Woerner | 62/50.2 |
| 3,565,201 | 2/1971 | Petsinger | 62/50.2 |
| 3,578,753 | 5/1971 | Freeman, Jr. | 62/50.4 |
| 3,710,584 | 1/1973 | Leonard | 62/50.4 |
| 3,827,246 | 8/1974 | Moen et al. | 62/50.2 X |
| 4,174,619 | 11/1979 | Tocha | 62/50.2 |
| 4,495,900 | 1/1985 | Stockmeyer | 123/527 X |
| 4,524,747 | 6/1985 | van den Wildenberg et al. | 123/527 X |
| 4,531,497 | 7/1985 | Smith | 123/525 |
| 4,774,909 | 10/1988 | Dolderer | 123/527 X |
| 4,995,367 | 2/1991 | Yamauchi et al. | 123/494 |
| 5,081,977 | 1/1992 | Swenson | 123/527 |
| 5,121,609 | 6/1992 | Cieslukowski | 62/50.4 |
| 5,127,230 | 7/1992 | Neeser et al. | 62/50.2 X |
| 5,163,409 | 11/1992 | Gustafson et al. | 123/527 X |
| 5,228,295 | 7/1993 | Gustafson | 123/525 X |

FOREIGN PATENT DOCUMENTS

| | | | |
|---|---|---|---|
| 2613175 | 10/1977 | Germany | 123/527 |
| 163145 | 10/1982 | Japan | 123/527 |

*Primary Examiner*—Christopher Kilner
*Attorney, Agent, or Firm*—Earl C. Hancock

[57] ABSTRACT

A natural gas vehicle fuel delivery system regulates the pressure of LNG which is vaporized and delivered to an engine. The system employs dual regulator valves responsive to the gas phase pressure of a storage tank to either directly couple vapor produced from a heat exchanger to an engine combustion system, or to divert that vapor through another heat exchanger contained within the tank itself. This additional heat exchanger maintains the pressure within the tank at the desired level despite heavy fuel demands of the engine. The system functions independent of liquid level in the storage tank. When multiple LNG storage tanks are used, they are coupled in parallel so that they both produce gas and are concurrently regulated in the gas phase portion. A pressure initializing structure and process are also provided.

16 Claims, 2 Drawing Sheets

5,373,700

NATURAL GAS VEHICLE FUEL VAPOR DELIVERY SYSTEM

BACKGROUND OF THE INVENTION

1. Field of the Invention

This invention relates to apparatus and methods for storing Liquid Natural Gas (LNG) and delivering it as vapor on demand for combustion in a vehicle engine. More particularly, the present invention relates to apparatus and methods for initializing and maintaining the pressure within an LNG storage and supply system for a vehicle powered by natural gas. While not necessarily limited thereto, the present invention is especially useful for automobiles, buses, trucks and other vehicles designed to operate through combustion of natural gas.

2. Description of the Prior Art

Various devices and methods exist for storing LNG, converting it to vapor, and delivering it at controlled pressures. Environmental and conservation demands have made it especially attractive to apply such systems for the combustion power source in motor vehicles. An example is described in U.S. Pat. No. 5,127,230 by Neeser et al which discloses a system for an LNG powered vehicle using a pair of storage tanks for the fuel. The system selects one or the other of the tanks, but does not couple them in parallel. A pressure regulation system senses the pressure within the tank, and passes the fluid from the tank through a heat exchanger to produce vapor before reintroducing it to the tank when the pressure falls too low. It is not capable of maintaining the selected tank pressure in the presence of a heavy demand for combustion gas by the vehicle. Thus, it is subject to stalling under extremely undesirable (if not catastrophic) circumstances.

Another approach, shown in U.S. Pat. No. 4,774,909 by Dolderer, is to respond to low pressure in an active tank of a motor vehicle powering system by transferring liquefied gas fuel from a holding tank. U.S. Pat. No. 4,524,747 by Wildenberg et al also employs liquid gas pumping to regulate pressure but in this case regulation is realized by injecting some liquid gas into the vaporized fuel when the pressure is too high.

Yet another variation of an LNG powered vehicle system using the direct feedback pressure regulation system is disclosed in U.S. Pat. No. 5,081,977 by Swenson which uses a bellows within the storage tank to control an output valve so as to pass liquid gas through an uninsulated pipe functioning as a heat exchanger before reintroducing it to the upper chamber of the tank.

An LNG fueling station, as described in U.S. Pat. No. 5,121,609 by Cieslukowski, transfers LNG from a storage tank to a delivery tank which is pressure regulated via a closed loop feedback system using a heat exchanger to convert LNG to vapor before introducing it to a delivery tank. A heat exchanger vaporizes the fuel to raise pressure, and liquid nitrogen cools the head gas when the pressure is too high.

U.S. Pat. No. 3,565,201 by Petsinger uses a regulator valve to allow gas to escape into an outlet line when excessive pressure is encountered in a storage tank. U.S. Pat. No. 4,995,367 by Yamauchi discloses computer controlled mixing of methanol and gasoline in a controlled ratio. U.S. Pat. No. 4,495,900 by Stockmeyer et al discloses a tank containing Zeolite fillers and parallel compartments which are sequentially switched to deliver methane to an accumulator for buffering the fuel to the engine.

The need remains in the art for a more effective fuel delivery system which is not dependent on gravity flow from the tank or tanks. The prior art LNG vehicle systems suffer from a loss of system pressure resulting in power loss or even vehicle stalling, especially in the presence of heavy demand. The problem of how to control the pressure of the fuel delivered to the engine is seriously aggravated in the prior art systems in high altitude environments. Furthermore, larger vehicles, such as buses and trucks powered by prior art LNG type systems, are even more vulnerable to the power loss and stalling problem even when the vehicle is handling a normal load demand. The prior art systems further did not effectively optimize the operating tank pressure in an LNG powered vehicle upon initial loading thereof.

SUMMARY OF THE INVENTION

This invention relates to an LNG system using balanced gas regulator valves in conjunction with a storage tank heat exchanger to control fuel pressure. It is a system and method which maintains and controls delivery pressure in an LNG tank independently of either engine vapor flow requirements or the liquid level in the tank. An object of the present invention is to provide a system which regulates the pressure of LNG delivered to an engine.

In order to accomplish the objects, the system employs dual regulator valves responsive to the gas phase pressure of a storage tank to either directly couple vapor produced from a heat exchanger to an engine combustion system, or to divert that vapor through another heat exchanger contained within the tank itself. This additional heat exchanger maintains the pressure within the tank at the desired level despite heavy fuel demands originating from the engine.

As a feature of the present invention, LNG storage tanks are coupled so that they concurrently produce gas and are regulated in the gas phase portion. Yet another feature of the present invention is the structure and process for initializing the operational LNG tank, or tanks, in a vehicle powered by LNG.

Apparatus and processes in accordance with this invention deliver natural gas within an optimal pressure range to a system outlet connection for ultimate delivery to an engine. An insulated tank holding the liquid natural gas has two sets of ports, one port of a first set opening into the upper portion of the tank interior, while the other of the ports of that first set opens into the lower portion of the tank.

A heat exchanger establishes a gas flow path within the tank to thermally couple the gas flow path and the liquid natural gas, as well as the vapor phase within the tank. A pair of control valves are connected to a common junction and are further connected to respond to the pressure within the tank. One of those valves is connected to pass fuel from the tank to the outlet connection to the engine when the tank pressure is above a predetermined level. The second valve is constructed to pass fuel through the heat exchanger within the tank when the tank pressure is below a certain level. A second heat exchanger is coupled between a lower port and the common junction of the control valves. A gas flow path connects the first mentioned valve output to the outlet connection into the vehicle combustion system. Preferably, the tank heat exchanger is arranged for thermal coupling with the liquid phase for any level of liquid remaining in the tank. The apparatus can include a third control valve coupled between an upper tank port and the outlet connection. This valve is preferably constructed to open when the tank pressure is above a certain level corresponding to the pressure demand level established by the engine, or other utilization device, for the vapor output.

Apparatus in accordance with this invention responds to demand from a utilizing device for vapor produced from a liquefied gas in a highly insulated storage container for the liquefied gas. A heat exchanger is coupled for receiving liquefied gas from the insulated storage container for producing a gas vapor output. A gas flow path is formed for thermally coupling gas introduced thereto with the contents of the insulated storage with the output of that path coupled to the utilizing device.

A valving arrangement is coupled for receiving the output of the heat exchanger, and is responsive to the pressure within the insulated storage for introducing the gas directly to the utilizing means whenever the insulated storage pressure is above a predetermined level. Conversely, the gas is introduced to the thermally coupled gas flow path input whenever the insulated storage pressure is below the aforementioned predetermined level. As a result, the apparatus maintains and controls delivery pressure in the insulated storage, independent of both vapor flow requirements by the utilizing device and the liquid level in the insulated storage.

Apparatus for initializing the pressure in the insulated storage includes structure for introducing high pressure gas to the input of the thermally coupling gas flow path. The thermally coupling gas flow path output is then coupled for releasing the gas within the liquid contained in the insulated storage.

More particularly, apparatus of this invention is intended for delivering natural gas within an optimal pressure range to a system outlet connection for ultimate delivery to an engine. An insulated tank holds the liquid natural gas, and has first and second sets of port pairs. One port of a first pair opens into the upper portion of the interior of the tank, while the other port of that pair opens into the lower portion of the interior of the tank. A first heat exchanger is coupled between the two ports of the second pair for establishing a gas flow path within the tank to thermally couple the gas flow path with the contents inside the tank.

A gas flow path connects the outlet of the heat exchanger to the system outlet connection. A second heat exchanger is coupled between the second port of the first pair of ports and a common junction of the control valves for converting liquid fuel passing therethrough into vapor. Fluid flow switching is achieved by first and second control valves which have their inputs coupled to a common junction. These valves are each responsive to the pressure within the tank, the first valve coupling fuel from the common junction to the system outlet connection when tank pressure is above a certain level, while remaining closed for pressure below that level.

The second valve is connected to introduce fuel to the first heat exchanger means when the tank pressure is below a certain level, while remaining closed when the pressure is above the aforesaid certain level. Thus, the tank delivery pressure is maintained relatively constant independent of vapor flow requirements of the engine, and likewise independently of the level of liquid natural gas in the tank.

The apparatus can also include a third control valve coupled between the upper portion of the tank interior and the system outlet connection, with this valve constructed to open when the tank pressure is at a level above the preferred standby level whereby vapor is fed directly to accommodate the engine fuel demand. This allows pressure regulation especially during inactive or standby periods.

Preferably, the heat exchanger contained within the insulated storage tank includes a tube formed in a tortuous path which is arranged for thermal coupling with the liquid remaining in the tank at any level. For instance, this can comprise a thermally conductive plate having the tube mounted thereon, with the plate extending between the lower and upper portions of the tank interior.

Methods in accordance with this invention are likewise intended for maintaining and controlling delivery pressure from a liquid natural gas storage tank independently of vapor flow requirements by an engine fueled by gas from that tank. In addition, this control is realized independently of the liquid level in the tank which has an internal gas flow path in thermally conducting relation with the interior of the tank. This process includes the steps of sensing a demand for gas fuel by the engine, and responding to this sensing step by converting liquid natural gas to vapor. The level of the pressure within the tank is compared to a predetermined pressure level, with the result determining the fluidic communication switching of the vapor between a direct connection to the engine, and a connection to the tank internal flow path.

The process of this invention can further include the step of bypassing the heat exchanging step whenever the pressure within the tank exceeds the pressure level demand from the engine. Thus, it is possible to directly couple vapor from the tank to the engine if the tank pressure is high enough. Furthermore, it is possible to regulate the tank pressure when the system is in a standby mode by recognizing that the pressure within the tank has dropped below a predetermined level, while no fuel demand is present from the engine, and converting some of the liquid natural gas from the tank into vapor for introduction to the tank interior.

The method of this invention for initializing pressure within a tank starts with the step of filling the tank with LNG. Natural gas at ambient temperature is passed through a heat exchanger within the tank. The gas discharged from the tank heat exchanger is then exhausted into the lower portion of the tank, thus allowing it to bubble up through the liquid natural gas, and raising the pressure in the tank.

A significant feature of the present invention is that the potential for maintaining tank pressure increases in proportion to the fuel demand so that pressure does not drop under high load conditions. This is a result not realized by the prior art. Furthermore, fuel systems implemented in accordance with this invention are independent of the level of liquid LNG in the tank, while conventional systems are highly level dependent. The prior art systems, using pressure sensing feedback which passes the LNG through a heat exchanger to convert it to gas before introduction to the gas phase of the storage tank, simply cannot keep up with the demand in high load conditions so that the engines they fuel tend to stall and suffer power loss.

The prior art systems increase tank pressure by adding gas which is a transient effect unless continued. The present invention attacks the fundamental pressurization problem by adding heat to the tank contents. When heat is added, tank pressure increases and stays that way until fluid is withdrawn. In contrast, adding gas pursuant to the prior art from a pressure buildup system, has an immediate physical effect which diminishes rapidly as the added gas cools and a portion condenses.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
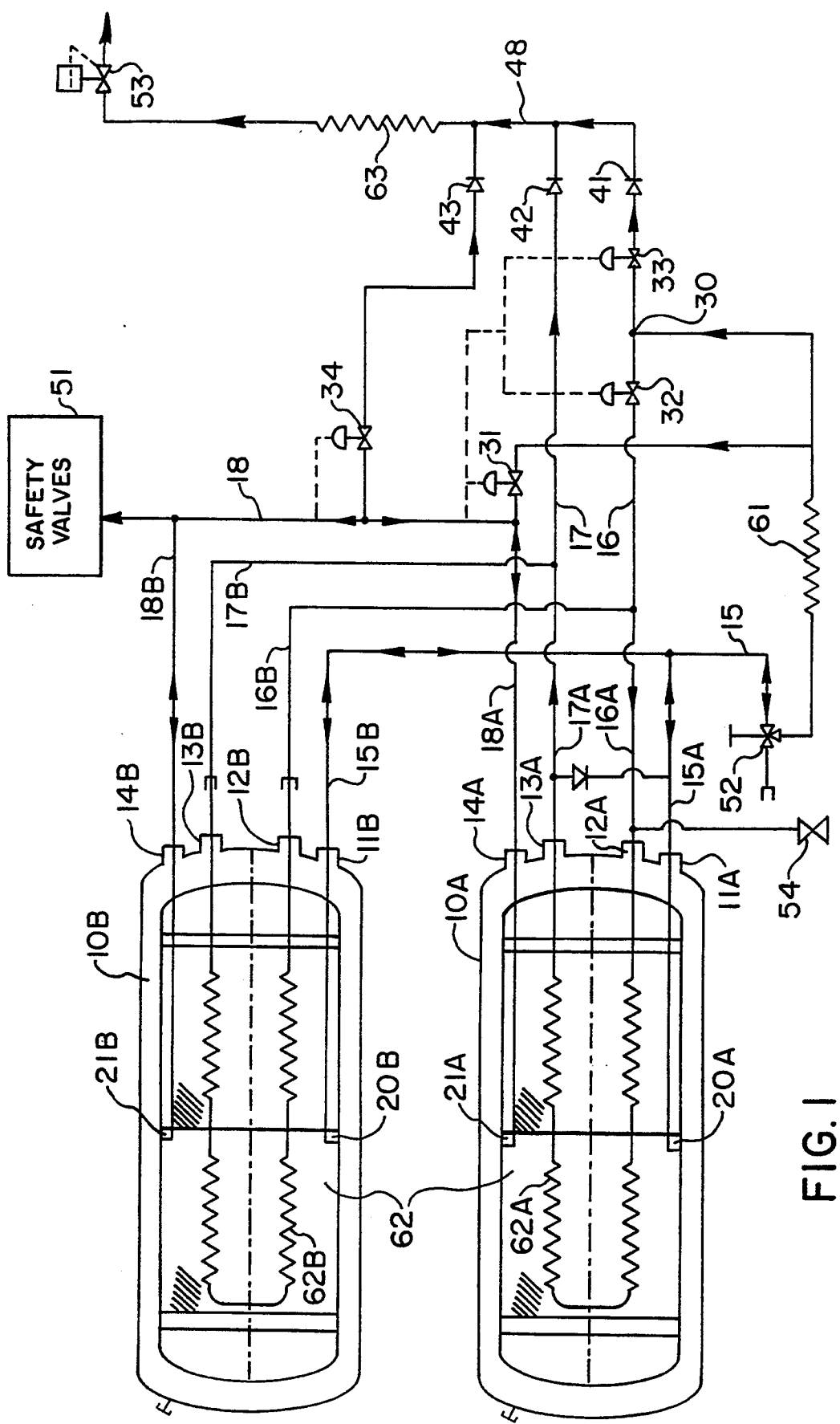
FIG. 1 is a system flow diagram illustrating the mechanical interaction of elements in the preferred embodiment of the invention.

The system flow diagram of FIG. 1 shows the overall mechanical interaction and operation of the preferred embodiment of the present invention in a dual tank configuration. It illustrates the flow paths for both liquid and vapor phases of an LNG system. This embodiment has two liquid natural gas storage tanks 10A and 10B. Embodiments with one tank, or with more than two parallel connected tanks, are also within the spirit and scope of the invention.

Preferably, tanks 10 are highly insulated dewar type tanks. They are coupled in parallel with respect to their ports 11 and 14, as shown with 11A and 11B directly coupled as are 14A and 14B. Ports 12B and 13B of tank 10B are also coupled in parallel with ports 12A and 13A, respectively, as shown. Thus, tanks 10A and 10B maintain a common internal pressure even if their liquid LNG levels differ and independently of the magnitude of any such difference. The parallel coupling of ports 11A and 11B, along with ports 14A and 14B, ensures that the internal pressure is common to both tanks 10A and 10B, and remains the same even under extreme circumstances.

Figure 3:
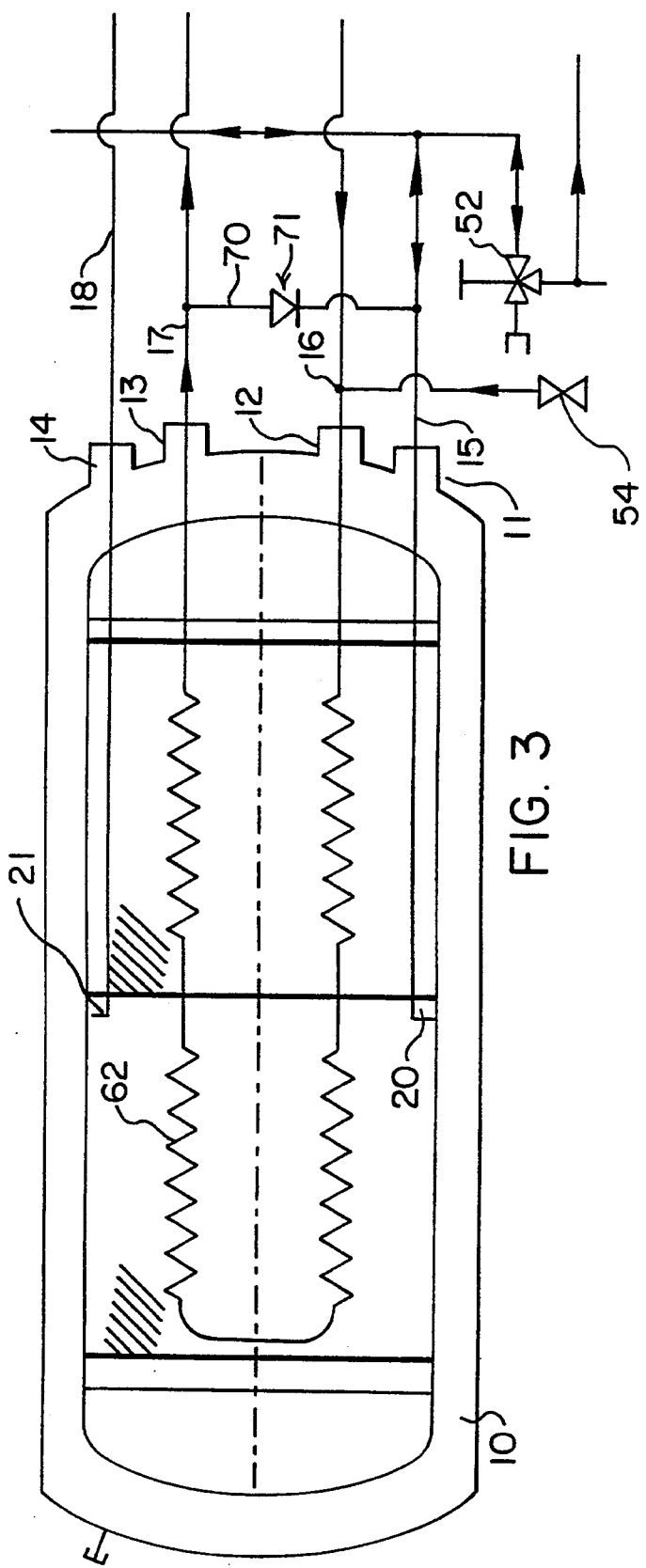
FIG. 3 is a partial flow diagram associated with a single tank, including additional structure used to initialize the pressure level within the tank or tanks in a FIG. 1 type of embodiment.

In typical operating conditions, an abnormal imbalance should never occur, such as where one tank is nearly full of LNG and the other completely empty of LNG. The levels of liquid in tanks 10A and 10B will remain almost the same from initial filling of those tanks to their exhaustion of LNG, unless the couplings of one of them are plugged or abnormally restricted. The vapor phase pressure in both tanks 10A and 10B is the same even if their levels are not equal, such as might result from vehicle orientation or mismatch in the fluid flow resistance of delivery lines 15A and 15B, for instance. Tanks 10 are filled with Liquid Natural Gas (LNG) through fill valve 52 and line 15, which terminates in open ended pipes 20. The description later herein with respect to FIG. 3 provides a discussion of how the pressure within the tanks is initialized.

When demand is made for fuel by the engine (not shown), LNG passes from tanks 10 through pipe 15 and through fill valve 52, which is switched during normal operation to direct the liquid fuel into heat exchanger 61. In the preferred embodiment, heat exchanger 61 is a conventional heat exchanger available from commercial vendors which uses a refrigerant as a thermal exchange medium. Preferably, it transfers heat from the coolant for the vehicle engine into the LNG from line 15. Thus, heat is extracted from the engine coolant, and the LNG is vaporized into natural gas. The natural gas then passes to a common junction 30 connected to both pressure control valves 32 and 33.

The pressure within the upper portion of both tanks 10 is sensed at line 18 by pressure sensitive valves 31, 32, 33, 34 and 51, as shown. Pressure regulator valve 31 responds to a low level of pressure within tanks 10, as reflected at line 18, by withdrawing LNG from lower ports 11 through heat exchanger 61 to produce vapor at a higher pressure for introduction to ports 14. That is, under static conditions, pressure regulator valve 31 is adequate to respond to a lower pressure level at line 18 than is desired by withdrawing LNG from lower ports 11 through heat exchanger 61 to produce vapor for introduction to ports 14. Vapor thus formed raises the pressure of tanks 10 up to the normal operating level at which time valve 31 closes.

Valve 31 may concurrently act with valve 32 when fuel is delivered, since valves 31 and 32 are both operable in response to a lower pressure sensed in line 18, but flow through valve 31 will remain minimal because differential pressure in the static pressurization loop is low.

Pressure control valves 32 and 33 determine the flow path of the fuel vapor demanded by the engine coupled to output valve 53. If the pressure within the tanks 10 as reflected in line 18 is not high enough, pressure control valve 32 opens to allow the heated fuel vapor to return into tanks 10 through pipe 16. The result is the fuel passes through heat exchangers 62, and exits tanks 10 via pipes 17 through check valve 42. It thereafter flows through heat exchanger 63 into the engine coupled output valve 53.

If the pressure within the tanks is adequate to ultimately supply the engine, valve 32 closes, while pressure control valve 33 opens to allow the fuel to pass through a final heat exchanger 63 before passing through the common output connection pipe 48, and thence through throttle controlled output valve 53 into the engine (not shown). Thus, the invention is able to maintain constant pressure within tanks 10 while concurrently compensating for changing demands by the engine. When a greater fuel demand occurs, the pressure within tanks 10 is kept at the optimal level by heating the LNG therein.

In actual operation, valves 32 and 33 do not mutually switch in a binary manner. Instead, they provide modulating control of the gas vapor coupled to the utilization output connection to valve 53. Valves 32 and 33 concurrently increase and decrease the amount of flow they permit so that there is a phasing of the switch function between them over a discrete but relatively short time period.

Pressure sensitive valve 34 functions as a so-called economizer valve in that it monitors the pressure level in the gas phase of tanks 10 via line 18. Whenever this pressure exceeds a predetermined maximum, fuel gas is delivered directly from the vapor phase present in the upper portion of tanks 10. This gas is passed through pipe 18, through economizer pressure control valve 34 and check valve 43 to final heat exchanger 63, and ultimately delivered to the engine. Normally, valve 34 is set to open at a higher pressure than valve 33 which senses the pressure level on line 18 in parallel with valve 34. If the pressure within tanks 10 should continue to increase even further, safety valve or valves 51 open to allow gas to vent from pipe 18 until the pressure within tanks 10 at least returns to the preselected maximum level.

During periods of inactivity with no fluid withdrawn, heat leakage into the LNG contents of tank 10 can cause a gradual increase in pressure. When this pressure exceeds the normal operating pressure by some predetermined amount, such as 20%, economizer pressure valve 34 opens. At this point when the engine is operating, vapor is preferentially drawn from the tank through the low pressure drop route consisting of line 18, valve 34 and check valve 43. Flow through this alternate route continues until pressure in the tank falls enough to close economizer valve 34, at which time flow to the engine is again supplied by valves 32 and 33.

In the event of an extended period of inactivity, pressure in LNG tank 10 will rise to its design pressure. At this point, safety valve(s) 51 will open and vent vapor, possibly to the atmosphere, thereby reducing the tank pressure. Should the period of inactivity continue, safety valves 51 will periodically open to maintain tank pressure within a range from the design pressure down to a setting about 10% lower.

Figure 2:
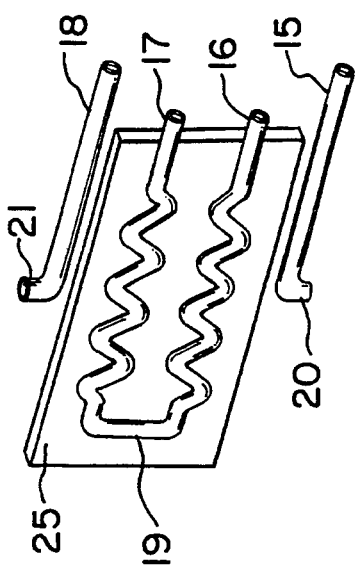
FIG. 2 is an isometric view of typical heat exchanger elements and interior piping shown within each of the tanks in FIG. 1.

FIG. 2 shows the configuration and operation of heat exchangers 62 located within tanks 10. Pipe 15 passes through lower port 11, and terminates in pipe end 20 which is open to the interior of tank 10. When introducing liquid fuel into tank 10, the fuel exits from open pipe end 20 into the lower portion of the tank, below the level of the residual LNG (if any). Similarly, pipe 18 passes through port 14, and opens at end 21 into the upper portion of the tank above the level of the LNG.

Pipes 16 and 17 are coupled in fluidic communication with the input and output ends of a single tortuous pipe 19. Pipe 19 forms a gas flow path which passes through the tank, in thermal communication with the contents of tank 10, so as to inject heat into the LNG. Mounting plate 25 is a thermal conductor in thermal contact with pipe 19, as well as the liquid and vapor phases within the interior of tank 10, to enhance the heat exchange operation. Plate 25, as seen in FIGS. 1 and 3, extends for the entire height of the interior of tank 10 but can contain openings therethrough and/or openings around the ends to allow liquid LNG to freely flow around or through it.

FIG. 3 illustrates the additional structure used to initialize the pressure level within the tanks 10. The pressurization process is initiated when tanks 10 are filled via appropriately switched valve 52. Natural gas at ambient temperature but relatively high pressure is then introduced with pressurization to a suitable level through valve 54 into pipe 16 to cause the gas to pass through port 12 into heat exchanger 62. The gas is discharged through port 13 into pipe 17. It is coupled through to pipe 15 via bypass 70, including unidirectional check valve 71. The gas then passes through port 11, and exhausts from pipe end 20 so as to bubble through the LNG in the tank 10. This raises the pressure within tank 10 to the point that pressure control valve 33 and/or 34 can begin delivering fuel through final heat exchanger 63 into the engine.

In operation, tank 10 is filled, and the initial pressurization established by pressurized natural gas through valve 54 and heat exchanger 62. The gas exits tank 10 into pipes 17 and 70 for ultimate release from the bottom of the inner chamber of tank 10 at port 20. Until such time as the pressure in the upper portion of the chambers of tanks 10 reaches a first level, valve 32 remains open, while valves 31, 33, 34 and 51 all remain closed. A demand for fuel vapor during this time is met by LNG from tank 10 vaporizing in heat exchanger 61, followed by traversing of the heat exchanger 62 within tanks 10 thereby injecting heat into those tanks to accelerate the increase of pressure within tanks 10. The fuel vapor exits tank 10, and passes through heat exchanger 63 before delivery to the output valve 53 for introduction to the engine.

Eventually, the pressure within tanks 10 will exceed a first predetermined level at which point valve 32 closes, while valve 33 opens. Fuel demand at this time is met by LNG vaporized in heat exchanger 61 and coupling through valve 33 into node connection 48, heat exchanger 63 and output valve 53. Should the pressure in tanks 10 exceed the first level and reach a somewhat higher second level, economizer valve 34 opens so as to directly vent gas vapor from the upper portion of the internal chamber of tanks 10 into the engine via output valve 53. While valve 33 is open concurrently with valve 34, most of the fuel vapor delivered to the output will come from the lower resistance path of valve 34 until the tank 10 pressure drops below the second level.

Further increase of the pressure above a third and even higher level will cause the safety valve 51 to open. Note that at this time valves 31, 33 and 34 are all open along with valve 51. They sequentially close as the pressure levels drop until they all are closed and valve 32, which has remained closed all this time opens.

The actual pressure levels at which the various valves operate, as described above, depends upon the demand pressure of the utilization device coupled to the output valve 53. This is mostly a function of the type of engine fueled by the gas. Typically, engine demand pressure can range anywhere from 100 psi to 300 psi. The valves are thus designed to perform their prescribed function, as described above, with the actuating pressure level of each valve thus predetermined so as to appropriately correlate with the engine demand pressure.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for responding to demand from a vehicle engine type of utilizing device for vapor from a liquefied gas comprising:

insulated means for storing the liquefied gas;

heat exchanger means coupled for receiving liquefied gas from said insulated means for producing a gas vapor output;

means forming a gas path between an input and an output thereof for thermally coupling gas introduced to said input with the contents of said insulated means and having said output coupled to the utilizing device;

valve means coupled for receiving said heat exchanger means output and responsive to the pressure within said insulated means for introducing the gas directly to the utilizing means whenever said insulating means pressure is above a predetermined level and for introducing the gas to said thermally coupling means input whenever said insulating means pressure is below said predetermined level whereby said apparatus maintains and controls delivery pressure in said insulated storing means independent of both vapor flow requirements by said utilizing device and the liquid level in said insulated storing means;

means for initializing the pressure in said insulated storing means including means for introducing high pressure gas to said thermally coupling means input; and means coupling said thermally coupling means output for releasing said gas within the liquid contained in said insulated storing means.

2. Apparatus in accordance with claim 1 wherein said insulated means includes a plurality of tanks coupled in parallel.

3. Apparatus in accordance with claim 2 wherein said thermally coupled means includes a heat exchanger in each said tank.

4. Apparatus in accordance with claim 1 wherein said insulated storage means includes at least one dewar tank and which apparatus includes means operable in response to the pressure in said tank in excess of a second predetermined level greater than said first mentioned predetermined level for withdrawing gas from said tank.

5. Apparatus in accordance with claim 4 wherein the output of said gas withdrawing means is coupled to the utilization device.

6. Apparatus in accordance with claim 5 which further includes safety valve means operable in response to the pressure in said tank above a third predetermined pressure which is greater than said second and first mentioned predetermined pressures for venting gas from said tank whereby the pressure within said tank is returned to a safe level.

7. Apparatus in accordance with claim 6 wherein said tank has first and second ports in respective fluid communication with the upper and lower portions of the interior of said tank with said heat exchanger coupled to said second port, said apparatus including a regulator valve coupled between the output of said heat exchanger and said first port and responding to pressure within said tank upper portion below a preselected level for introducing gas from said heat exchanger into said tank upper portion until said preselected pressure is present within said tank.

8. Apparatus in accordance with claim 1 wherein said valve means includes first and second valves having their inputs commonly coupled to said heat exchanger output with said first valve output coupled to provide gas to said thermally coupling means input and the output of said second valve coupled to the utilization device.

9. Apparatus for delivering natural gas within an optimal pressure range to a system outlet connection for ultimate delivery for combustion in an engine comprising:

an insulated tank for holding liquid natural gas and having first and second sets of port pairs, one port of said first set opening into the upper portion of the interior of said tank and the other port of said first set opening into the lower portion of the interior of said tank;

a first heat exchanger means coupled between said ports of said second set of ports for establishing a gas flow path within said tank to thermally couple said gas flow path and the contents within said tank;

gas flow path means connecting the outlet of said heat exchanger to the system outlet connection;

second heat exchanger means coupled between said second port of said first set and a common junction for converting liquid fuel passing therethrough into vapor;

fluid flow switching means including first and second control valves having their inputs coupled to said common junction and each responsive to the pressure within the upper portion of said tank, said first valve coupling fuel from said common junction to the system outlet connection when tank pressure is above a certain level while remaining closed for pressure below said certain level, and said second valve constructed to introduce fuel to said first heat exchanger means when the tank pressure is below said certain level while remaining closed when the pressure is above said certain level; and a regulator valve coupled between said second heat exchanger output and said port opening into said tank upper portion with said regulator valve closing in response to a drop in internal pressure of said tank below a predetermined level whereby the delivery pressure in said tank is maintained relatively constant independent of vapor flow requirements of the engine independently of the level of liquid natural gas in said tank.

10. Apparatus in accordance with claim 9 which also includes a third control valve coupled between said tank interior upper portion and the system outlet connection with said valve constructed to open when the tank pressure is at a level above said certain level whereby vapor is fed directly to accommodate the engine fuel demand.

11. Apparatus in accordance with claim 9 wherein said first heat exchanger includes a tube formed in a tortuous path within said tank and arranged for thermal coupling with the liquid remaining in said tank at any level.

12. Apparatus in accordance with claim 10 wherein said first heat exchanger output and said first valve output are coupled together in a common connection; said apparatus including third heat exchanger means coupling said common connection to the system output connection.

13. Apparatus in accordance with claim 12 which includes a safety valve operable to vent vapor from said tank in response to presence of pressure within said tank above a preselected maximum safe level.

14. The method of maintaining and controlling delivery pressure from a liquid natural gas storage tank independently of vapor flow requirements by an engine fueled by gas from said tank and independently of the liquid level in said tank which tank has an internal gas flow path in thermally conducting relation with the interior of said tank with the output of said flow path being coupled to the engine comprising the steps of:

sensing a demand for gas fuel by said engine;

responding to said sensing step by converting liquid natural gas to vapor;

comparing the level of the pressure within said tank to a predetermined pressure level;

switching the fluidic communication of said vapor in response to said comparing step between a direct connection to said engine when said pressure within said tank exceeds said predetermined level and to said tank internal flow path whenever said pressure within said tank is less than said predetermined level; and regulating said tank pressure including the steps of
recognizing that the pressure within said tank has dropped below a predetermined level while no fuel demand is present from said engine;
converting liquid natural gas from said tank into vapor; and
introducing said vapor to said tank interior.

15. The method in accordance with claim 14 which includes the step of bypassing said responding step whenever the pressure within said tank exceeds the pressure level demand from said engine.

16. Apparatus for delivering natural gas within an optimal pressure range to a system outlet connection for ultimate delivery to an engine comprising:

an insulated tank for holding liquid natural gas and having first and second sets of port pairs, one port of said first set opening into the upper portion of the interior of said tank and the other port of said first set opening into the lower portion of the interior of said tank;

a first heat exchanger means coupled between said ports of said second set of ports for establishing a gas flow path within said tank to thermally couple said gas flow path and the contents within said tank, said first heat exchanger including a tube formed in a tortuous path within said tank and arranged for thermal coupling with the liquid remaining in said tank at any level;

said first heat exchanger further including a thermally conductive plate having said tube mounted thereon with said plate extending between the lower and upper portions of said tank interior;

gas flow path means connecting the outlet of said heat exchanger to the system outlet connection;

second heat exchanger means coupled between said second port of said first set and said common junction of said control valves for converting liquid fuel passing therethrough into vapor; and fluid flow switching means including first and second control valves having their inputs coupled to a common junction and each responsive to the pressure within said tank, said first valve coupling fuel from said common junction to the system outlet connection when tank pressure is above a certain level while remaining closed for pressure below said certain level, and said second valve constructed to introduce fuel to said first heat exchanger means when the tank pressure is below said certain level while remaining closed when the pressure is above said certain level;

whereby the delivery pressure in said tank is maintained relatively constant independent of vapor flow requirements of the engine independently of the level of liquid natural gas in said tank.

* * * * *